United States Patent [19]

Fahey et al.

[11] 4,304,970
[45] Dec. 8, 1981

[54] TELEPHONE STATUS MONITOR APPARATUS

[75] Inventors: Robert J. Fahey, Framingham; Martin L. Resnick, Chestnut Hill, both of Mass.

[73] Assignees: GTE Products Corp., Stamford, Conn.; GTE Laboratories Inc., Waltham, Mass.

[21] Appl. No.: 94,012

[22] Filed: Nov. 14, 1979

[51] Int. Cl.³ .................................................. H04Q 9/00
[52] U.S. Cl. ................................. 179/84 R; 179/81 R
[58] Field of Search .............. 179/84 R, 84 A, 18 HB, 179/18 FA, 18 F, 81 R, 2 A, 1 MN, 5 R

[56] References Cited

U.S. PATENT DOCUMENTS 3,899,644  8/1975  Hunt .................................. 179/84 R
4,087,646  5/1978  Brolin et al. ....................... 179/84 R

*Primary Examiner*—Bernard Konick
*Assistant Examiner*—Joseph A. Popek
*Attorney, Agent, or Firm*—Peter Xiarhos

[57] ABSTRACT

A telephone status monitor apparatus for determining the on/hook and off/hook conditions of a telephone connected across tip and ring terminals across which a ringing voltage may be present and superimposed on normal on/hook and off/hook voltages. The ringing voltage typically has an "on" time of two seconds and an "off" time of four seconds. The apparatus in accordance with the invention includes status circuitry operative under microprocessor control to repetitively sample the voltage across the tip and ring terminals on the minute and on the minute plus three seconds, the latter three second interval being intermediate to the two second "off" time and four second "on" time of the ringing voltage. Each sampled voltage is compared with a reference voltage as a result of which an output signal is produced by the status circuitry having either a first value representative of an apparent on/hook condition or a second value representative of an apparent off/hook condition. The values of successive output signals corresponding to the samples on the minute and on the minute plus three seconds are examined by the microprocessor. When a pair of successive output signals have the same value, either the first value or second value, an output condition representative of an on/hook condition or off/hook condition, respectively, is produced by the microprocessor.

14 Claims, 1 Drawing Figure

TELEPHONE STATUS MONITOR APPARATUS

CROSS-REFERENCE TO RELATED APPLICATIONS

The present application discloses subject matter which is disclosed, and claimed, in the following co-pending applications:

Ser. No. 965,808, filed Dec. 4, 1978, now U.S. Pat. No. 4,224,478, in the names of Robert J. Fahey and Martin L. Resnick, entitled "DATA TRANSMISSION CIRCUIT", and assigned to GTE Sylvania Incorporated and GTE Laboratories Incorporated;

Ser. No. 965,809, filed Dec. 4, 1978, now U.S. Pat. No. 4,220,825, in the name of Robert J. Fahey, entitled "TELEPHONE STATUS MONITOR CIRCUIT", and assigned to GTE Sylvania Incorporated;

Ser. No. 965,756, filed Dec. 4, 1978, now U.S. Pat. No. 4,224,602, in the names of Richard W. Anderson and Alfred I. Bottner, entitled "SIGNALLING DEVICE", and assigned to GTE Sylvania Incorporated.

Ser. No. 965,757, filed Dec. 4, 1978, in the name of Alfred I. Bottner, entitled "Design for SIGNALLING DEVICE", and assigned to GTE Sylvania Incorporated;

Ser. No. 973,201, filed Dec. 26, 1978, now U.S. Pat. No. 4,220,872, in the name of Robert J. Fahey, entitled "D.C. POWER SUPPLY CIRCUIT", and assigned to GTE Sylvania Incorporated;

Ser. No. 973,218, filed Dec. 26, 1978, now U.S. Pat. No. 4,225,792, in the name of Robert J. Fahey, entitled "DETECTOR CIRCUIT", and assigned to GTE Sylvania Incorporated;

Ser. No. 25,298, filed Mar. 30, 1979, in the names of Richard W. Anderson and Alfred I. Bottner, entitled "Design for HOUSING FOR ELECTRONIC CIRCUITRY", and assigned to GTE Sylvania Incorporated;

Ser. No. 75,782, filed Sept. 17, 1979, in the name of Richard L. Naugle, entitled "SENSING APPARATUS", and assigned to GTE Laboratories Incorporated;

Ser. No. 75,769, filed Sept. 17, 1979, in the names of Richard L. Naugle and William L. Geller, entitled "EXIT-ENTRY APPARATUS", and assigned to GTE Laboratories Incorporated;

Ser. No. 94,015, filed concurrently herewith, in the names of Jeffrey R. Fox, Arthur Margolies, Rob Moolenbeek and Martin L. Resnick, entitled "APPARATUS FOR MONITORING AND SIGNALLING SYSTEM", and assigned to GTE Laboratories Incorporated;

Ser. No. 94,018, filed concurrently herewith, in the names of Richard W. Anderson, J. Edward Schlener and Martin L. Resnick, entitled "APPARATUS FOR MONITORING AND SIGNALLING SYSTEM", and assigned to GTE Sylvania Incorporated and GTE Laboratories Incorporated;

Ser. No. 94,013, filed concurrently herewith, in the names of Richard W. Anderson and J. Edward Schlener, entitled "APPARATUS FOR MONITORING AND SIGNALLING SYSTEM", and assigned to GTE Sylvania Incorporated;

Ser. No. 94,242, filed concurrently herewith, in the names of Robert J. Fahey and Martin L. Resnick, entitled "APPARATUS FOR MONITORING AND SIGNALLING SYSTEM", and assigned to GTE Sylvania Incorporated and GTE Laboratories Incorporated;

Ser. No. 94,014, filed concurrently herewith, in the names of Robert J. Fahey and Martin L. Resnick, entitled "APPARATUS FOR MONITORING USAGE OF A TELEPHONE", and assigned to GTE Sylvania Incorporated and GTE Laboratories Incorporated;

Ser. No. 94,245, filed concurrently herewith, in the names of Robert A. Norbedo and Martin L. Resnick, entitled "APPARATUS FOR SIGNALLING SYSTEM", and assigned to GTE Laboratories Incorporated;

Ser. No. 94,241, filed concurrently herewith, in the name of Martin L. Resnick, entitled "DATA PROCESSING APPARATUS FOR RECEIVING AND PROCESSING CODED WORDS", and assigned to GTE Laboratories Incorporated;

Ser. No. 94,016, filed concurrently herewith, in the names of Richard W. Anderson, Robert J. Fahey, William R. McClellan, and J. Edward Schlener, entitled "MONITORING AND SIGNALLING SYSTEM", and assigned to GTE Sylvania Incorporated;

Ser. No. 94,017, filed concurrently herewith, in the names of Hans G. Blank and Martin L. Resnick, entitled "APPARATUS FOR COMMUNICATING WITH PROCESSING APPARATUS OVER A TELEPHONE NETWORK", and assigned to GTE Laboratories Incorporated;

Ser. No. 94,243, filed concurrently herewith, in the names of Robert J. Fahey and Robert A. Norbedo, entitled "APPARATUS FOR SIGNALLING SYSTEM", and assigned to GTE Sylvania Incorporated and GTE Laboratories Incorporated;

Ser. No. 94,019, filed concurrently herewith, in the names of Robert J. Fahey, Robert A. Norbedo and J. Edward Schlener, entitled "APPARATUS FOR MONITORING AND SIGNALLING SYSTEM", and assigned to GTE Sylvania Incorporated and GTE Laboratories Incorporated;

Ser. No. 94,244, filed concurrently herewith, in the names of Robert J. Fahey and Robert A. Norbedo, entitled "APPARATUS FOR SIGNALLING SYSTEM", and assigned to GTE Sylvania Incorporated and GTE Laboratories Incorporated; and Ser. No. 94,246, filed concurrently herewith, in the names of Robert J. Fahey, Robert A. Norbedo and Martin L. Resnick, entitled "VARIABLE TIMING SYSTEM", and assigned to GTE Sylvania Incorporated and GTE Laboratories Incorporated.

The following co-pending applications are directed to apparatus which may be employed in the signalling and monitoring system of the present invention:

Ser. No. 75,783, filed Sept. 17, 1979, in the names of Jeffrey R. Fox, Arthur Margolies, and Rob Moolenbeek, entitled "ELECTRICAL POWER SUPPLY APPARATUS", and assigned to GTE Laboratories Incorporated; and Ser. No. 84,976, filed in the name of William L. Geller, entitled "DIGITAL COMMUNICATIONS RECEIVER", and assigned to GTE Laboratories Incorporated.

BACKGROUND OF THE INVENTION

The present invention relates to a monitoring and signalling system. More particularly, the present invention relates to a monitoring and signalling system such as a home health care system for monitoring the activities of individuals within their own homes, apartments, etc., and for providing bi-directional communication between these locations and a centralized communications center.

In recent years, as the general population has become older and the number of elderly persons in the population has increased, and also as a result of increased social welfare legislation directed to the needs of these persons, there has been an increased reliance and utilization of professional care institutions such as hospitals, nursing homes and retirement centers for providing health care and maintenance for these individuals. A large majority of these individuals are maintained and cared for in such institutions for good and proper reasons, most typically for the treatment of medical problems requiring medical facilities and equipment and the professional services of doctors, nurses and the like. However, there are a number of individuals who are presently maintained in institutions without medical reason. These individuals generally have no family or friends to care for them or who do not wish to impose upon or burden such family or friends and are prepared to sacrifice some measure of independence for the security and freedom from worry, anxiety, and loneliness that institutions can provide. It has therefore been recognized that if alternatives to institutionalization can be provided, especially for those individuals who do not require constant or continuing institutional attention or observation, while providing a substantial degree of security and independence for these individuals, preferably within their own homes, the burdens on the institutional care system can be reduced and result in lower health care costs. Any such alternatives which would also produce the same results for individuals other than the elderly, such as young handicapped, disabled or infirm adults, would also have the effect of improving the quality of life of such individuals and, at the same time, reducing health care costs.

A variety of apparatus and systems have been proposed heretofore directed to solutions to the problems as discussed hereinabove. One such system, developed in Sweden, is described in U.S. Pat. No. 3,885,235 and is adapted to monitor passively normal, routine activities of an individual in his or her own residence and to produce alarm conditions in the event these routine activities are not performed during some specified period of time, for example, a period of up to 24 hours. The system as described in the patent includes a plurality of actuating units which may be variously located in predetermined areas of the residence, such as halls, lavatories, bathrooms and bedrooms, and which may be associated with apparatus likely to be actuated or used routinely by the individual during the normal course of the day. This apparatus may include, by way of example, lighting circuits, radio sets, television sets and household appliances. Actuation or use of any one of the actuating units during the aforesaid specific time period will cause an electromechanical timer set to this time period to be reset and to repeat its timing cycle. In the event no actuating unit is actuated or used during the time period, for example, due to inactivity or incapacity of the individual, the timer times out after the time period and an alarm condition, for example, in the form of an audible or visual alarm, is produced by the system indicative of this situation. If the alarm condition was produced as the result of inactivity rather than incapacity, the user may disable the system by the use of a master switch. The master switch may also be used to disable the system when the individual leaves his or her residence for a prolonged period of time, for example, for a period of time greater than the time period of the timer. Upon return of the individual, the system is arranged so that routine operation of any one of the actuating units will have the effect of resetting the timer and causing the timer to repeat its timing cycle. The system as described above may also include an alarm switch in the residence for use by the individual in producing alarm conditions during emergencies, such as medical emergencies or accidents.

In a later version of the system as described in the aforementioned U.S. Pat. No. 3,885,235, known as the "Automatic Warning Aid (AWA)", additional features are provided, including a direction sensitive photocell optics arrangement in the bathroom; an electronic timer having two time periods, specifically, a short time period associated with the bathroom optics arrangement and a longer time period associated with all other actuating units; a pre-alarm cycle effective prior to an actual alarm cycle and during which an alarm condition can be cancelled or aborted; and remote alarm transmission. In this later system, recognition is given to the fact that the majority of accidents occur in the bathroom. Accordingly, the system is arranged so that when an individual enters the bathroom the direction sensitive photocell arrangement detects this entry and causes the timing cycle of the electronic timer to be reduced to its short time period, for example, about one hour. If the individual does not exit within the one hour period, for example, due to incapacity or inactivity of the individual, a pre-alarm cycle will be initiated and, if the pre-alarm cycle is not terminated or aborted by the individual, an actual alarm cycle will be initiated after passage of a short period of time (e.g., about ½ hour). In the event the individual exits from the bathroom within the one hour period, the direction sensitive photocell arrangement will detect this exit and cause the timing cycle of the electronic timer to be set or returned to its longer time cycle, for example, about 8 hours. During any pre-alarm cycle caused by non-use of any of the actuating units within the individual's residence the individual may, unless incapacitated, abort or cancel the pre-alarm cycle by actuation or use of any actuating unit (which resets the timer) so that no actual alarm condition will be produced. The alarm condition may be generated locally or, if desired, transmitted over a telephone network, for example, in the form of a recorded message, to a central alarm center from which communication with the individual may be attempted and/or help sent or summoned.

Another system which has been proposed heretofore for passively monitoring the activities of individuals within their own residences and for producing appropriate alarm conditions is described in U.S. Pat. No. 3,989,900. In this system, the use of a standard telephone is monitored. Each time the handset of the telephone is lifted off or removed from the cradle of the telephone, for example, during the making and receiving of routine telephone calls, a timer set to cycle through a predetermined time period, for example, up to 24 hours, is caused to be reset and to repeat its timing cycle. So long as the telephone is used during the time period of the timer no alarm condition will be produced. If no use of the telephone is made during the time period of the timer, for example, due to incapacity or inactivity of the individual, a local alarm condition is produced and, simultaneously therewith, a magnetic tape player is actuated to dial continuously a plurality of telephone numbers of locations at which help may be available and to transmit a prerecorded message that help is needed at the address of the individual. If the timing out of the timer was due to inactivity rather than incapacity, the user may, in response to the local alarm condition, abort the alarm condition and data transmission sequence (within a time period of about 90 seconds) by simply lifting and replacing the handset back on the cradle of the telephone thereby resetting the timer. This latter operation may also be used to reset the timer at such time as the individual plans to leave his residence for a period of time less than the predetermined time period of the timer. An activating switch is also provided in the system for activation of the alarm condition in the case of emergencies. The abovementioned patent also contemplates the use of a high speed digital dialer and transmitter in place of the aforementioned magnetic tape player. In this case, the timing out of the timer will produce a local alarm condition and, unless the alarm sequence is aborted (for example, within a 5 minute period), the digital dialer and transmitter will operate to seize a telephone line to establish communication with the central station. The dialing of the central station continues until a receiving signal has been received from the central station whereupon an identification signal can be sent to the central station.

In still other systems which have been proposed heretofore for enabling individuals to be maintained within their own residence while providing appropriate alarm signalling in emergency or accident situations, a transmitter is employed by an individual to communicate under a variety of conditions with control apparatus located on the premises. The transmitter, which may be in the form of a small, portable hand held unit or a unit carried in a pocket or purse or attached to clothing or worn as a pendant (e.g., see U.S. Pat. Nos. 4,121,160 and 4,134,108), may be used by the individual to communicate with the control apparatus in a variety of situations, including emergency or accident situations, to respond to periodic check signals or stimuli from the control apparatus as an indication that "all is well" (e.g., see U.S. Pat. No. 3,662,111), or to respond within predetermined time periods of timer apparatus. The signals from the transmitter are typically coded rf signals employed to control circuitry within the control apparatus. Activation of a transmitter in an emergency or accident situation, or failure to activate a transmitter at required times, for example, due to incapacity or inactivity, will ordinarily cause an alarm cycle to be initiated which, if not aborted or cancelled by the individual, will cause an alarm sequence to be initiated for informing others of the emergency, accident or inactivity situation. The alarm sequence may be variously initiated by digital or tape dialers and include one or more messages, identification data, etc., to be communicated, for example, over a telephone network, to such organizations or individuals as an emergency center, the police or fire department, ambulance service, doctors, paramedics, rescue teams, relatives, friends or neighbors. In many systems, repeated attempts will be made to communicate alarm information to a central location using one or more telephone numbers, and some systems may include handshaking operations between a local control unit and central equipment and include test calls for determining proper functioning of the systems.

While the various systems as described above are useful to a degree in alleviating the problems of individuals living alone, they all have serious shortcomings and disadvantages which limit their effectiveness and usefulness. As a group, for example, these systems utilize simple data handling, processing and communication techniques, being limited more or less to tape and digital dialing, the transmission and reception of limited amounts of data, and, in some cases, simple handshaking and parity-checking operations. It is not known, for example, that any of these systems employ computers, microprocessors, or the like capable of performing significant and substantial data processing, either within the residences of individuals or at central locations. As a result, these systems are susceptible to a high false alarm rate and reliability problems, these latter problems being especially exascerbated in those systems employing mechanical tape dialers and electromechanical timers and the like. In these systems, therefore, due to the lack of sophisticated data processing and communications, there is inadequate guarantee, if any, that a successful and satisfactory transmission of data, such as alarm conditions or information, has been achieved so that those persons charged with acting on this information can adequately discharge their duties. The systems as described above, perhaps also as a result of their limited data processing and communications capabilities, have limited capability in detecting or pinpointing, and distinguishing between, the malfunction of various critical components thereof, for example, actuating units, control apparatus or telephone lines. In these systems, the malfunction of a critical component thereof will, assuming that such malfunction is somehow communicated to a responsible person (e.g., as a result of an alarm condition), ordinarily require service personnel to enter a person's home and check out the entire system or a major part thereof to pinpoint the particular source of trouble or malfunction. Further, in those systems employing timers having one or more resettable time periods (e.g., a one-hour bathroom cycle and/or a regular 8-hour cycle), these time periods are alterable only within the residences of individuals, thereby requiring costly service calls by service personnel to effect the alterations. The alteration of timer periods only within the residences of individuals can also have the effect of increasing the chances of tampering by these individuals.

In addition to the abovementioned general shortcomings and disadvantages, the systems as described hereinabove have other and more specific shortcomings and disadvantages which limit their effectiveness and usefulness in a home health care environment. For example, in the Swedish systems the multiple actuating units and the alarm switches are hard-wired to the control units. This hard-wiring operation makes the installations of these systems complex, time-consuming and expensive. In addition, while using several diverse "passive" actuating units, the Swedish systems do not make use of a common passive actuating unit generally available and used frequently in most residences, namely, the telephone. While the systems described in U.S. Pat. No. 3,989,900 employ a telephone as a passive actuating unit, no other passive actuating units are employed, thereby reducing the scope of monitoring of the activities of individuals. In addition, only on/hook to off-/hook transitions of the telephone are used to reset the timer in the control unit. Thus, at the conclusion of a telephone conversation the off/hook to on/hook transition resulting from the individual replacing the handset on the cradle of the telephone will not reset the timer, thereby having the probable effect of increasing the alarm rate of the system. In the case of the systems employing rf transmitters for transmitting alarm conditions or responding to predetermined check signals, these systems similarly do not employ passive actuating units and thereby have a reduced scope of monitoring of the activities of individuals and, therefore, a reduced effectiveness.

BRIEF SUMMARY OF THE INVENTION

In accordance with the present invention, a telephone status monitor circuit is provided which may be employed in a system such as a home health care system as described hereinabove. The telephone status monitor circuit is utilized to determine the on/hook and off/hook conditions of a telephone connected across tip and ring terminals across which a ringing voltage may be present and be superimposed on normal voltages corresponding to on/hook and off/hook conditions of the telephone. The ringing voltage has a predetermined "on" time (e.g., 2 seconds), and a predetermined "off" time (e.g., 4 seconds).

The telephone status monitor circuit in accordance with the invention includes a control means adapted to receive a pair of pulses spaced from each other by a time duration having a value intermediate (e.g., 3 seconds) to the values of the "on" and "off" times of the ringing voltage. The control means operates in response to each pulse received thereby to be actuated between first and second operating states. A charging circuit means is arranged when the control means is in its first operating state to be placed by the control means in circuit with the tip and ring terminals and when the control means is in its second operating state to be removed by the control means out of circuit with the tip and ring terminals. The charging circuit means operates when coupled in circuit with the tip and ring terminals to be charged to the value of the voltage then present across the tip and ring terminals.

A status circuit means is arranged when the control means is in its second operating state to be connected by the control means in circuit with the charging circuit means. The status circuit means operate when connected with the charging circuit means to examine the voltage to which the charging circuit means has been charged. When the value of the voltage examined by the status circuit means bears a predetermined first relationship to a prescribed reference value, the status circuit means operates to produce an output signal of a first value representative of an apparent on/hook condition; when the value of the voltages bears a predetermined second relationship to the prescribed reference value, the status circuit means operates to produce an output signal of a second value representative of an apparent off/hook condition.

A processing means is arranged to receive the output signals produced by the status circuit means corresponding to the pair of pulses and to compare the values of the output signals. If the output signals both have the first value, the processing means operates to produce an output condition representative of an on/hook condition; if the output signals both have the second value, the processing means operates to produce an output condition representative of an off/hook condition.

BRIEF DESCRIPTION OF THE DRAWING

Various objects, features and advantages of a monitoring and signalling system in accordance with the present invention will be had from a detailed discussed taken in conjunction with the accompanying drawing in which.

DETAILED DESCRIPTION OF THE INVENTION

Figure 1:
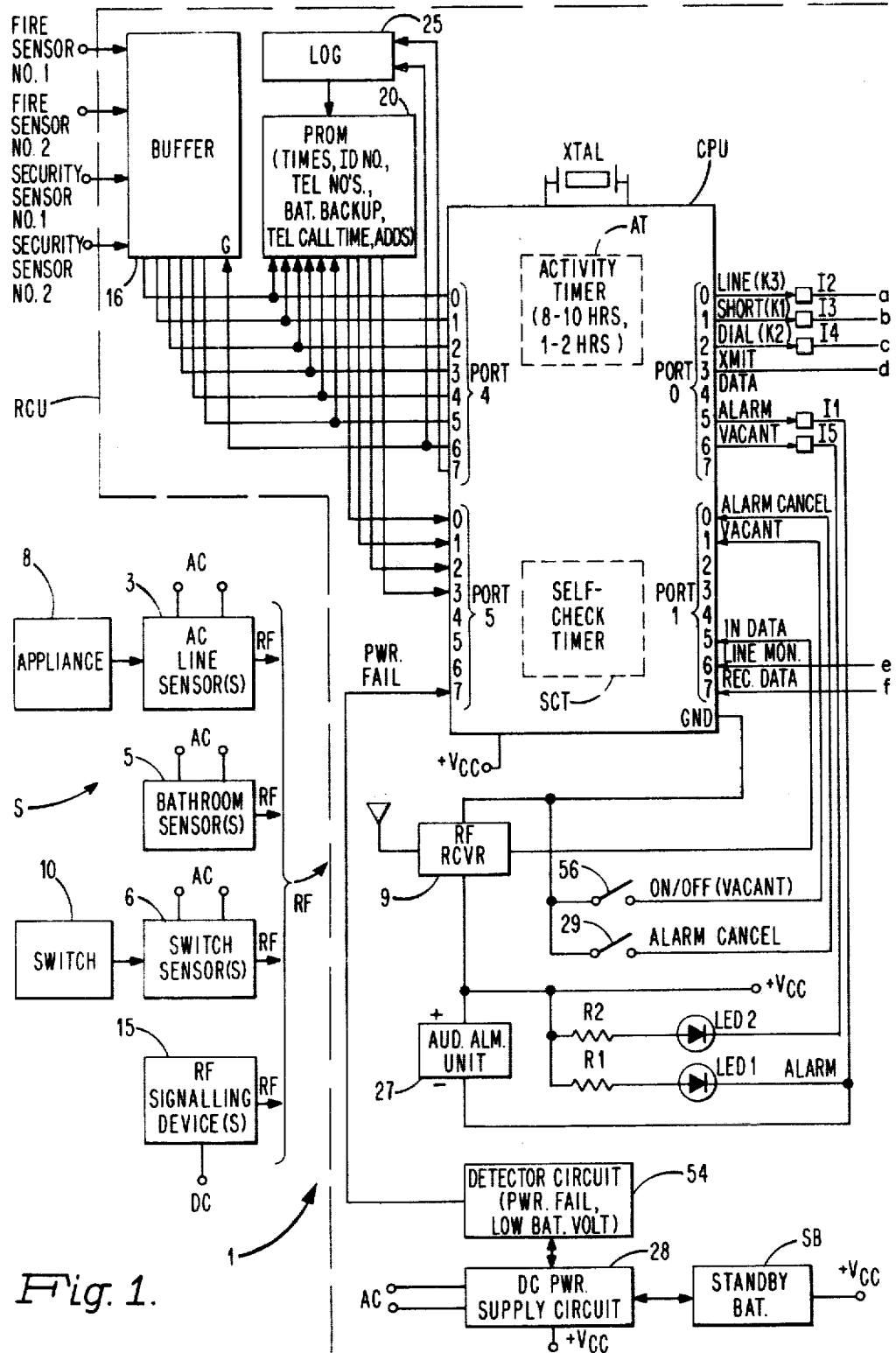
FIG. 1 is a schematic block diagram of a monitoring and signalling system in accordance with the present invention.
Figure 1:
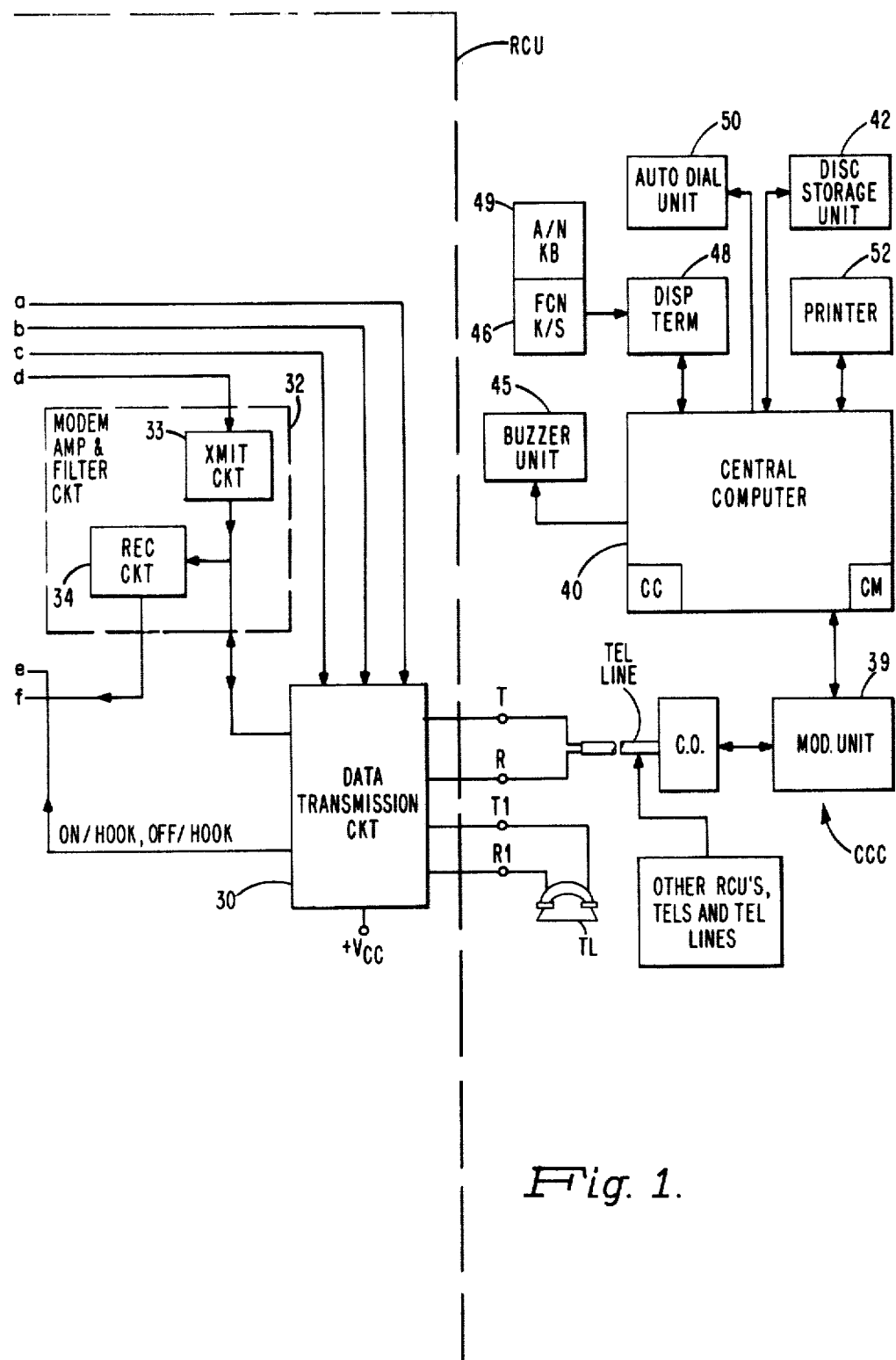

The present invention is described in detail in a co-pending patent application Ser. No. 94,019, filed Nov. 14, 1979 in the names of Robert J. Fahey, J. Edward Schlener and Robert A. Norbedo. The following portions of that co-pending application are incorporated herein by reference:

(a) FIGS. 2–66 and the corresponding brief description thereof under the heading "BRIEF DESCRIPTION OF THE DRAWING"; and (b) The entire portion of the specification following the heading "DETAILED DESCRIPTION OF THE INVENTION".

What is claimed is:

1. A telephone status monitor apparatus for determining the on/hook and off/hook conditions of a telephone connected across tip and ring terminals across which a ringing voltage may be present and be superimposed on normal voltages corresponding to on/hook and off/hook conditions of the telephone, said ringing voltage having a predetermined "on" time and a predetermined "off" time, said telephone status monitor circuit comprising:

control means adapted to receive a pair of pulses spaced from each other by a time duration having a value intermediate to the values of the "on" and "off" times of the ringing voltage, said control means being operative in response to each of the pulses received thereby to be actuated between first and second operating states;

charging circuit means arranged when the control means is in its first operating state to be placed by the control means in circuit with the tip and ring terminals and when the control means is in its second operating state to be removed by the control means out of circuit with the tip and ring terminals;

said charging circuit means being operative when coupled in circuit with the tip and ring terminals by the control means to be charged to the value of the voltage then present across the tip and ring terminals;

status circuit means arranged when the control means is in its second operating state to be connected by the control means in circuit with the charging circuit means, said status circuit means being operative when connected with the charging circuit means to examine the voltage to which the charging circuit means has been charged and when the value of the voltage bears a predetermined first relationship to a prescribed reference value to produce an output signal of a first value representative of an apparent on/hook condition, and operative when the value of the voltage bears a predetermined second relationship to the prescribed reference value to produce an output signal of a second value representative of an apparent off/hook condition; and processing means arranged to receive the output signals produced by the status circuit means corresponding to the pair of pulses and to compare the values of said output signals, said processing means being operative if the output signals both have the first value to produce an output condition representative of an on/- hook condition and operative if the output signals both have the second value to produce an output condition representative of an off/hook condition.

2. A telephone status monitor apparatus in accordance with claim 1 wherein the processing means comprises:

first and second storage means operative to store therein the values of the output signals produced by the status circuit means corresponding to the pair of pulses;

means operative to compare the values of the output signals stored in the first and second storage means; and means operative if the values of the output signals are the same to produce an output indicating that the values are the same and to employ said output with the particular first or second value of the output signals to provide an output condition representative of the on/hook condition or the off/hook condition.

3. A telephone status monitor apparatus in accordance with claim 2 wherein:

the ringing voltage has an "on" time of two seconds and an "off" time of four seconds; and the control means is adapted to receive the pair of spaced pulses wherein the pulses are spaced from each other by three seconds.

4. A telephone status monitor apparatus in accordance with claim 1 wherein:

the charging circuit means includes a capacitance element.

5. A telephone status monitor apparatus in accordance with claim 4 wherein:

the control means comprises:

first means adapted to receive the pair of pulses and operative in response to each of the pulses to be controlled between first and second states; and first and second monitor switch means associated with the first means and operative in response to the first means being controlled between the first and second states to switch between corresponding first and second positions;

said charging circuit means being arranged when the first and second monitor switch means are in their first positions to be placed, together with the first and second monitor switch means, in a series path with the tip and ring terminals and across the tip and ring terminals, and further arranged when the first and second monitor switch means are in their second positions to be removed from the series path to the tip and ring terminals and from across the tip and ring terminals.

6. A telephone status monitor apparatus in accordance with claim 5 wherein the status circuit means comprises:

circuit means arranged when the first and second monitor switch means are in their second positions to be coupled across the charging circuit means, said circuit means being operative to derive a voltage from the voltage to which the charging circuit means has been charged; and means operative to compare the value of the voltage derived by the circuit means with a reference voltage and when the value of the derived voltage bears a predetermined first relationship to the value of the reference voltage to produce an output signal of a first value representative of an apparent on/hook condition and operative when the value of the derived voltage bears a predetermined second relationship to the value of the reference voltage to produce an output signal of a second value representative of an apparent off/hook condition.

7. A telephone status monitor apparatus in accordance with claim 6 wherein:

the charging circuit means includes a series combination of a capacitance element and a resistance element.

8. A telephone status monitor apparatus in accordance with claim 6 wherein said status circuit means includes:

first and second diodes;

voltage-divider circuit means connected in series with and intermediate to the first and second diodes;

said first and second diodes and said voltage divider circuit means being arranged when the first and second monitor switch means are in their second positions to be placed in a series path with the charging circuit means and the first and second switch means;

said voltage-divider circuit means being operative in response to the voltage to which the charging circuit means has been charged to derive a voltage therefrom having a value related to the value of the charged voltage; and comparator means coupled to the voltage-divider circuit means and having an input for receiving a reference voltage of a predetermined value, said comparator means being operative to compare the value of the voltage derived by the voltage-divider circuit means and the value of the reference voltage and operative when the values of the compared voltages bear a predetermined first relationship to each other to produce an output signal of a first value representative of an apparent on/hook condition and operative when the values of the compared voltage bear a predetermined second relationship to each other to produce an output signal of a second value representative of an apparent off/hook condition.

9. A telephone status monitor apparatus in accordance with claim 8 wherein the processing means comprises:

first and second storage means operative to store therein the values of the output signals produced by the status circuit means corresponding to the pair of pulses;

means operative to compare the values of the output signals stored in the first and second storage means; and means operative if the values of the output signals are the same to produce an output indicating that the values are the same and to employ said output with the particular first or second value of the output signals to provide an output condition representative of the on/hook condition or the off/hook condition.

10. A telephone status monitor apparatus in accordance with claim 9 wherein:

the ringing voltage has an "on" time of two seconds and an "off" time of four seconds; and the control means is adapted to receive the pair of spaced pulses wherein the pulses are spaced from each other by three seconds.

11. A telephone status monitor apparatus for determining the on/hook and off/hook conditions of a telephone connected across tip and ring terminals across which a ringing voltage may be present and be superimposed on normal voltages corresponding to on/hook and off/hook conditions of the telephone, said ringing voltage having a predetermined "on" time and a predetermined "off" time, said telephone status monitor circuit comprising:

control means adapted to receive a series of pairs of spaced pulses, the first pulse of each pair of pulses being spaced from the first pulse of the next pair of pulses by a first duration and the pulses of each pair of pulses being spaced from each other by a second duration, said second duration having a value intermediate to the values of the "on" and "off" times of the ringing voltage, said control means being operative in response to each pulse received thereby to be actuated between first and second operating states;

charging circuit means arranged when the control means is in its first operating state to be placed by the control means in circuit with the tip and ring terminals and when the control means is in its second operating state to be removed by the control means out of circuit with the tip and ring terminals;

said charging circuit means being operative when coupled in circuit with the tip and ring terminals by the control means to be charged to the value of the voltage then present across the tip and ring terminals;

status circuit means arranged when the control means is in its second operating state to be connected by the control means in circuit with the charging circuit means, said status circuit means being operative when connected with the charging circuit means to examine the voltage to which the charging circuit means has been charged and when the value of the voltage bears a predetermined first relationship to a prescribed reference value to produce an output signal of a first value representative of an apparent on/hook condition, and operative when the value of the voltage bears a predetermined second relationship to the prescribed reference value to produce an output signal of a second value representative of an apparent off/hook condition; and processing means arranged to receive output signals produced by the status circuit means corresponding to each pair of pulses and to compare the values of said output signals, said processing means being operative if the output signals corresponding to a pair of pulses both have the first value to produce an output condition representative of an on/hook condition and operative if the output signals corresponding to a pair of pulses both have the second value to produce an output condition representative of an off/hook condition.

12. A telephone status monitor apparatus in accordance with claim 11 wherein the processing means comprises:

first and second storage means operative to store therein the values of successive output signals produced by the status circuit means corresponding to each pair of pulses;

means operative to compare the values of successive output signals stored in the first and second storage means; and means operative if the values of successive output signals are the same to produce an output indicating that the values are the same and to employ said output with the particular first or second value of the output signals to provide an output condition representative of the on/hook condition or the off/hook condition.

13. A telephone status monitor apparatus in accordance with claim 12 wherein:

the ringing voltage has an "on" time of two seconds and an "off" time of four seconds; and the control means is adapted to receive the series of pairs of spaced pulses wherein the first pulse of each pair of pulses is spaced from the first pulse of the next pair by one minute and the pulses of each pair of pulses are spaced from each other by three seconds.

14. A telephone status monitor apparatus in accordance with claim 13 wherein:

the charging circuit means includes a capacitance element.

* * * * *